United States Patent
Ward et al.

[11] Patent Number: 5,184,958
[45] Date of Patent: Feb. 9, 1993

[54] EDUCATIONAL DOLL

[76] Inventors: Richard Ward, 9271 Irish Rd., Mt. Morris, Mich. 48458; John Lemek, 2014 Fox Hill Dr., Apt. 1, Grand Blanc, Mich. 48439

[21] Appl. No.: 872,479

[22] Filed: Apr. 23, 1992

[51] Int. Cl.$^5$ .............................................. G09B 19/00
[52] U.S. Cl. .................................... 434/162; 434/433; 446/268
[58] Field of Search ................ 434/162, 433; 446/268, 446/369, 390

[56] References Cited

U.S. PATENT DOCUMENTS

| | | | |
|---|---|---|---|
| 4,715,842 | 12/1987 | Noble | 446/390 X |
| 4,795,397 | 1/1989 | Stevens | 446/369 X |
| 5,125,864 | 6/1992 | Robertson et al. | 446/268 |

Primary Examiner—Gene Mancene
Assistant Examiner—L. Thomas
Attorney, Agent, or Firm—Dykema Gossett

[57] ABSTRACT

A method of matching at least two persons possessing dolls of similar characteristics for the purpose of having the parties communicate with each other about said dolls in the fashion of adoptive parents communicating about biological siblings is disclosed. After choosing a doll, children complete an "adoption" form associated with their doll and send a copy of it to a clearing house. The clearing house matches the children according to predetermined criteria and sends a letter to each child about the other child in the match. Letters are exchanged between the children and a communication link is established.

21 Claims, 2 Drawing Sheets

EDUCATIONAL DOLL

BACKGROUND OF THE INVENTION

The present invention relates to an educational kit and method for encouraging communication between two persons possessing dolls of similar characteristics.

Dolls fulfill a wide range of functions. They maya provide a source of reassurance. They often act as a prop to encourage a child's use of imagination. Dolls frequently teach children about issues which relate to the child's surroundings. Many dolls are even designed to fulfill specific educational related functions. Under the prior art, however, the usefulness of a doll is generally limited to its physical attributes. Thus, the use of dolls to promote additional educational experiences is largely unexplored.

It is an object of the present invention to provide a source of outside stimulation related to a doll which goes beyond the doll's physical attributes. It is a further object of the present invention to foster a special relationship between the child and his or her doll. This relationship helps facilitate a further object of the present invention, the initiation of communication between children using their dolls as a common denominator and conversational facilitator. Through such communication, writing skills are enhanced while simultaneously giving young children the opportunity to meet other children.

SUMMARY OF THE INVENTION

The present invention discloses an educational kit and a method of teaching. The method matches at least two persons possessing dolls of similar characteristics for the purpose of having the parties communicate with each other about their dolls in the fashion of adoptive parents.

Multiple dolls are used. A first child selects one of the dolls and a second child selects a second doll. An "adoption" form connected to each of the dolls is completed and a copy is sent to a clearing house. If necessary, instructions are included to assist in filling out the adoption form and to explain the process being undertaken. The clearing house matches the children according to predetermined criteria. Preferably, the completed form includes the name, address, and age of the child possessing the doll and, if desired, other pertinent information considered necessary to make a meaningful match. A computer program may be used to store this information and then match the children according to the predetermined criteria established.

Under the present invention, dills are not restricted to human representations. Animals and imaginary figures may be utilized as well. It is generally preferred that matches between dolls representing a single species be used. It is also generally expected that the dolls would share common features so that they could be biologically "related" to each other. It is recognized, however, that under certain circumstances it may be desirable to de-emphasize physical distinctions between dolls. A registration number on each adoption form may be used to reflect information about the physical make-up of the doll connected to the form. The same registration number may appear on the doll itself. Upon receiving the form, the clearing house can match the children according to the physical make-up of the doll which they possess.

Preferably, the predetermined criteria used by the clearing house to match children includes age. Most preferably, the children should be within a year of each other so as to increase the likelihood of having common interests.

It is also preferred that the predetermined criteria used by the clearing house match children from diverse geographic locations. Ideally, it would be desirable to match children from different states or regions of the country.

Once the first child is matched with a second child, a letter is sent to each of the children giving pertinent information about the other child. Preferably, this information includes the name, address, and age of the other child and information on the doll each child has adopted. The children may then communicate with each other using their "adopted" dolls as a starting point.

DETAILED DESCRIPTION OF A PREFERRED EMBODIMENT

Figure 1:
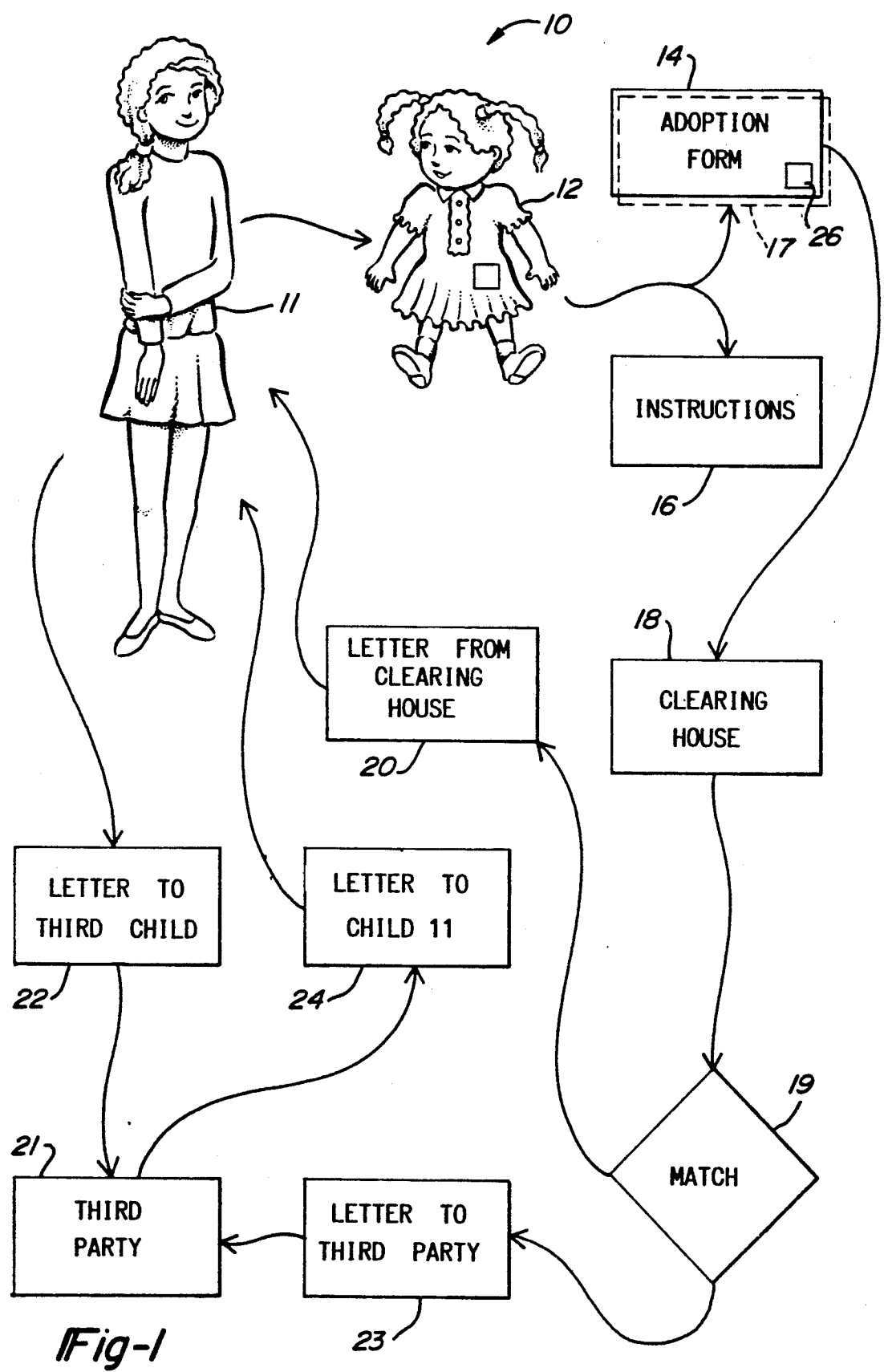
FIG. 1 displays the correspondence between the child, the clearing house and the third party.

FIG. 1 illustrates an educational kit 10 from the perspective of a child 11. It includes a doll 12 and an adoption form 14 associated with doll 12. Adoption form 14 is completed according to instructions 16. Instructions 16 may also be used to explain the process of establishing a writing relationship between children. Once completed, a copy 17 of adoption form 14 is sent to a clearing house 18. Clearing house 18 makes a match 19 and then sends a letter 20 back to child 11 with information concerning a third party 21 possessing a similar doll 12. After receipt of letter 20, child 11 sends a letter 22 to third party 21 pursuant to information received in letter 20. Similarly, a letter 23 is sent from clearing house 18 to third party 21. After receipt of letter 23, third party 21 then sends a letter 24 to child 11. A registration number 26 may be present on adoption form 14. The same registration number 26 may also be present on doll 12.

Figure 2:
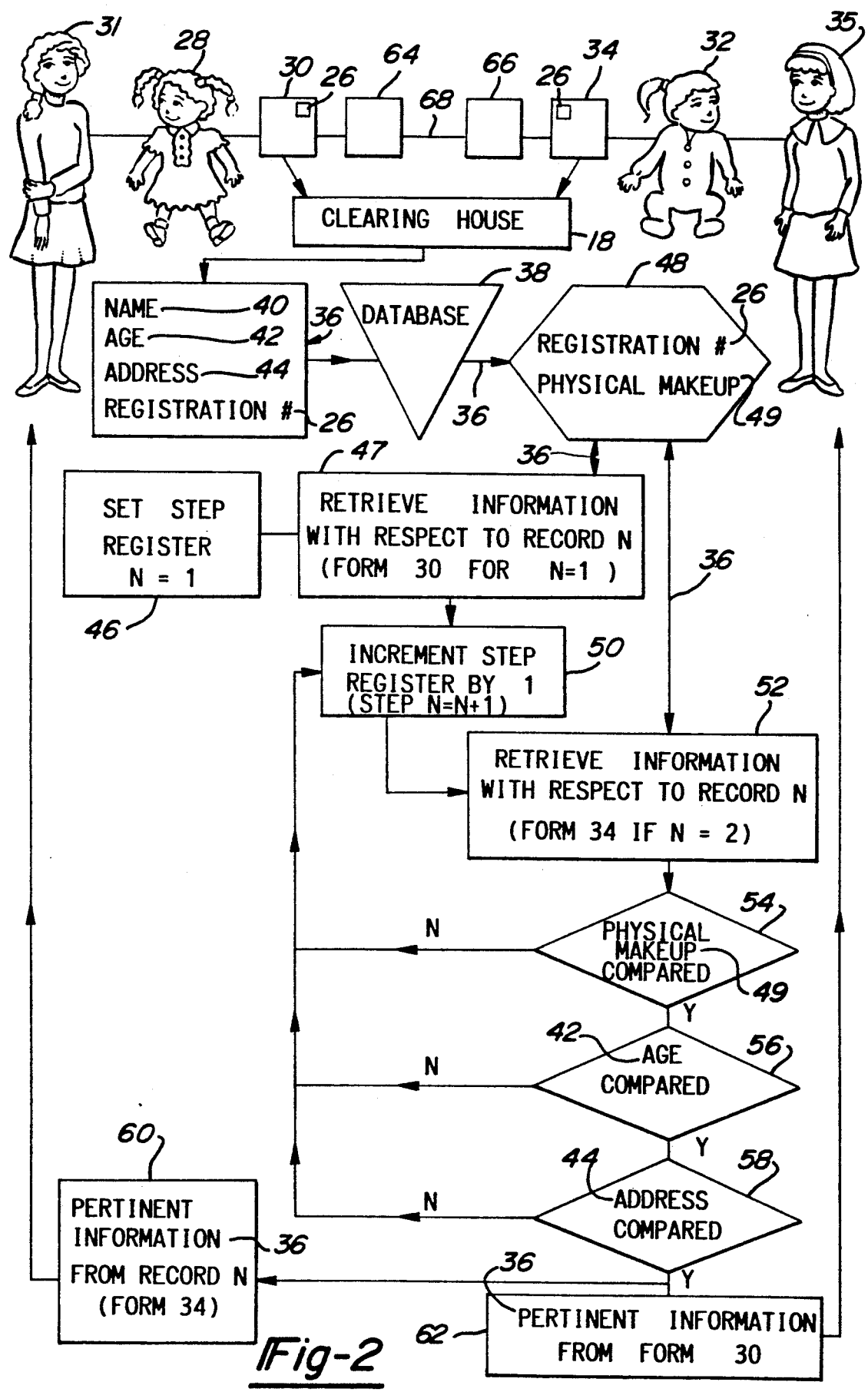
FIG. 2 displays the preferred method of matching the child with a third party.

FIG. 2 illustrates the present invention more fully. Multiple dolls with an adoption form associated with each doll are provided. A first doll 28 and accompanying adoption form 30 is provided to a first child 31. A doll 32 and accompanying adoption form 34 is provided to a different child 35. Adoption forms 30 and 34 are completed and a copy of each adoption form is sent to clearing house 18. Clearing house 18 records the pertinent information 36 provided on adoption forms 30 and 34 and stores it in a database 38. Pertinent information 36 includes at least name 40, age 42, address 44, and registration number 26. When making a match, at location 46 variable N is set to the value of 1. At location 47, clearing house 18 retrieves and reads information with respect to record N. Since variable N equals 1 at this point, record 1 is retrieval and pertinent information 36 related to the possession of doll 28 is read. At decipher location 48, registration number 26 is deciphered to provide the physical make-up 49 of doll 28. At location 50 variable N is incremented by one. At location 52 clearing house 18 retrieves information with respect to the record represented by variable N. Since variable N equals 2 at this point, pertinent information 36 is read from database 38 with respect to the possession of doll 32. At decipher location 48, registration No. 26 for form 34 is deciphered in order to provide the physical make-up 49 of doll 32.

At decision location 54 the physical make-up 49 of dolls 28 and 32 are compared. The degree of similarity required depends on the type of doll used and the amount of realism required by the "adoption". If human-like dolls are used, it is desirable to have dolls which share common physical characteristics. Preferably, they should only have subtle physical differences if it is desired that the children communicated about their "adoption" of biological siblings. It is recognized, however, that under certain circumstances it may be desirable to de-emphasize physical distinctions between dolls. It is further recognized that fewer physical similarities may be required with respect to animals or mythical and imaginary creatures. If dolls 28 and 32 meet the predetermined criteria concerning physical make-up 49 clearing house 18 proceeds at decision location 56 to compare the age 42 of child 31 and the age 42 of child 35. If dolls 28 and 32 do not meet the predetermined criteria, then at location 50 variable N is incremented by one, and pertinent information 36 from form 30 is not further compared with pertinent information 36 from form 34. Instead, clearing house 18 compares pertinent information 36 provided on form 30 with pertinent information provided from the next form available in database 38. In this case, since variable N equals 3, record 3 would be retrieved and read. This comparison process continues until either a match is made or no further forms are available to be examined.

At decision location 56 the age 42 of children 31 and 35 are compared. Preferably, children 31 and 35 are within a year of each other. It is assumed that similarity of age will result in a greater likelihood of common interests. Preferably, if age 42 as recorded on form 30 is not within a year of age 42 recorded on form 34 then at location 50, variable N increments by one. A new form is then read as described above.

At decision location 58 address 44 of child 31 from form 30 and address 44 of child 35 from form 34 are compared. Preferably, children 31 and 35 possessing dolls 28 and 32 live in a different state. Ideally, they live in different parts of the country. If address 44 as recorded on form 34, is not sufficiently different, a new form is then read as described above. Otherwise, pertinent information 36 from forms 30 and 34 match. Upon a match, form letters 60 and 62 are generated. Pertinent information 36 provided from form 34 is sent by letter 60 to child 31. Similarly, pertinent information 36 provided from form 30 is sent by letter 62 to child 35. Child 31 sends a letter 64 to child 35. Child 35 sends a letter 66 to child 31. Thus, a communication link 68 is established between them.

It is expected that in their initial communications attention will focus on dolls 28 and 32, with dolls 28 and 32 being a common denominator between children 31 and 35. Over time, however, it is expected that letters will focus on other matters. Thus, children 31 and 35 will learn writing skills at the same time they are learning about another child of a similar age in a different part of the country.

It is also envisioned that under the present invention a computer program may be used to store and match pertinent information 36 recorded from copies of adoption forms received by clearing house 18 according to criteria such as that disclosed.

A preferred embodiment of the present invention has been disclosed. A worker of ordinary skill in the art, however, would recognize that certain modifications would come within the scope of this invention. For that reason the following claims should be studied in order to determine the true scope and content of this invention.

We claim:

1. A method of matching at least two persons possessing dolls of similar characteristics for the purpose of having the parties communicate with each other about said dolls, comprising the steps of:
    (a) a first child selecting a first doll from a multiple of said dolls;
    (b) a second child selecting a second doll from the remaining said multiple of said dolls;
    (c) each said doll having an adoption form associated with said doll, said child completing said adoption form with pertinent information about said child;
    (d) each said child sending said completed adoption form to a clearing house;
    (e) said clearing house matching said first child with said second child according to a predetermined criteria; and
    (f) said clearing house sending a letter to each said child about the other said child said letter including said pertinent information contained in each said completed adoption form.

2. A method as recited in claim 1, comprising the further step of:
    (g) each said child communicating with the other said child.

3. A method as recited in claim 1, wherein said pertinent information includes the name, age, and address of said child.

4. A method as recited in claim 1, wherein said adoption form includes a registration number, said registration number reflecting information about each said doll including the physical make-up of each said doll.

5. A method as recited in claim 4, wherein said doll includes said registration number.

6. A method as recited in claim 4, including the step of said clearing house comparing said physical make-up of each said doll as deciphered from each said registration number.

7. A method as recited in claim 6, with said predetermined criteria requiring that said physical make-up of said first doll be similar to said physical make-up of said second doll.

8. A method as recited in claim 7, with said predetermined criteria requiring that said physical make-up of said first doll be subtly different from said physical make-up of said second doll.

9. A method as recited in claim 3, including the step of said clearing house comparing said age of said second child with said age of said first child.

10. A method as recited in claim 9, with said predetermined criteria requiring that said age of said second child be within one year of said age of said first child.

11. A method as recited in claim 3, including the step of said clearing house comparing said address of said second child with said address of said first child.

12. A method as recited in claim 11, with said predetermined criteria requiring that said second child live in a state distinctly different from that of said first child.

13. A method as recited in claim 4, including the steps of:

said clearing house comparing said physical make-up of each said doll as deciphered from each said registration number;
comparing said age of said second child with said age of said first child; and
comparing said address of said second child with said address of said first child.

14. A method of matching at least two persons possessing dolls of similar characteristics for the purpose of having the parties correspond with each other, comprising the steps of:
(a) a first child selecting a first doll from a multiple of said dolls;
(b) a second child selecting a second doll from the remaining said multiple of said dolls;
(c) each said doll having an adoption form associated with said doll, said adoption form including a registration number, said registration number reflecting information about said doll including the physical make-up of said doll, each said child completing said adoption form with pertinent information about said child, said pertinent information including the name, age, and address of said child;
(d) each said child sending said completed adoption form to a clearing house;
(e) said clearing house matching said first child with said second child according to a predetermined criteria, comprising the sub steps of:
(1) said clearing house comparing said physical make-up of each said doll as deciphered from each said registration number;
(2) comparing said age of said second child with said age of said first child; and
(3) comparing said address of said second child with said address of said first child; and
(f) said clearing house sending a letter to each said child about the other said child, said letter including said pertinent information contained in each said completed adoption form.

15. A method as recited in claim 14, comprising the further step of:
(g) each said child communicating with the other said child.

16. A method as recited in claim 14, wherein said pertinent information is stored using a computer program, said program matching each said child with the other said child according to said predetermined criteria.

17. An educational kit to encourage communication between at least two children, comprising:
(a) multiple dolls, each said doll having general physical similarities when compared to another said doll, a first child having selected a first said doll and a second child having selected a second said doll;
(b) an adoption form connected with each said doll, said adoption form being completed with pertinent information about said child and said pertinent information being used by a clearing house to match said first child with said second child according to a predetermined criteria; and
(c) a letter sent by said clearing house to each said child about the other said child, said letter including said pertinent information contained in said adoption form.

18. An educational kit as recited in claim 17, wherein said pertinent information includes the name, age, and address of said child.

19. An educational kit as recited in claim 17, wherein said adoption form includes a registration number, said registration number reflecting information about said doll including the physical make-up of said doll.

20. An educational product as recited in claim 17, wherein said predetermined criteria includes said physical similarities, said age of said first child being within one year of said second child, and said first child living in a state distinctly different than that of said second child.

21. An educational kit as recited in claim 20, wherein said pertinent information is stored using a computer program, said computer program being used to match said first child with said second child according to said predetermined criteria.

* * * * *